Oct. 20, 1953      C. McNEIL      2,655,898
APPARATUS FOR MAKING BLOOD FILMS
Filed Oct. 21, 1950
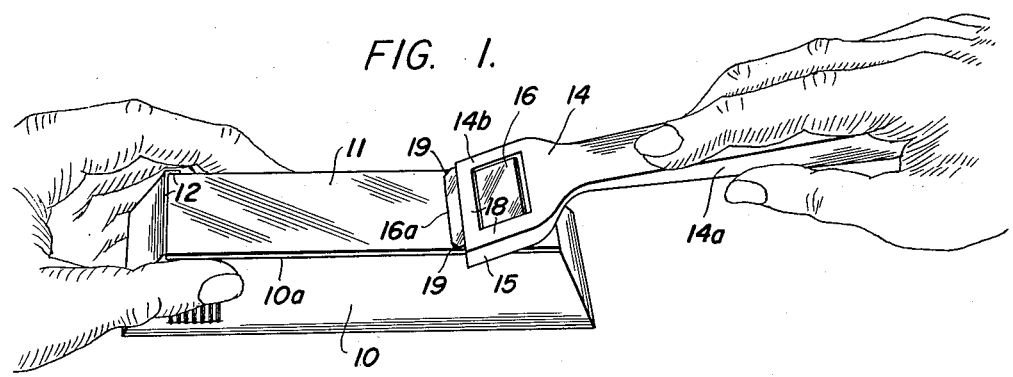
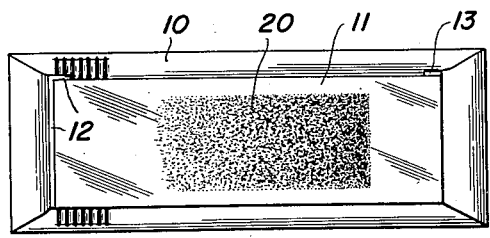
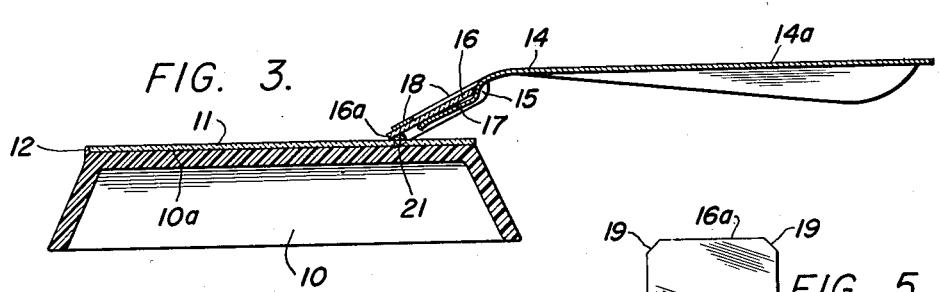
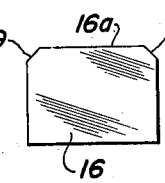
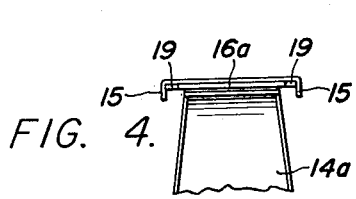
Inventor:
CRICHTON McNEIL,
Attorneys.

Patented Oct. 20, 1953

2,655,898

UNITED STATES PATENT OFFICE 2,655,898

APPARATUS FOR MAKING BLOOD FILMS

Crichton McNeil, Salt Lake City, Utah

Application October 21, 1950, Serial No. 191,398

5 Claims. (Cl. 118—506)

This invention relates to apparatus for making blood films for microscopic examination, as customarily carried out by practicing physicians, pathologists in hospitals, and medical laboratory technicians.

Very little has been done in the past in the way of providing apparatus of the character concerned. It is still common practice in the art to smear a drop of specimen blood on a microscope slide by manipulating a second and similar slide over the surface of the first. In so doing, it is customary to employ one of the end edges of the second slide as a smearing blade.

This procedure, however, has never resulted in blood films of uniformly good quality for microscopic examination. Generally, the film is irregular at certain points and "feathers" poorly at the thin end. Furthermore, the film as a whole is not centered where microscopic examination can be accomplished advantageously and free of distortion. There is a tendency for the bulk of the blood to travel to the edges of the slide, where it is impossible to examine it satisfactorily.

A principal object of the present invention, therefore, is to provide apparatus for manual manipulation which eliminates the disadvantages noted above, and which enables the making of uniformly high quality blood films on the glass slides ordinarily employed for microscopic examinations.

Other important objects are:

To prevent excessive travel of the blood toward the longitudinal edges of the microscope slide.

To ensure the making of a film which is centered across the width of the slide and has straight longitudinal edges.

To confine the blood film to a width suitable for covering by the usual cover slip.

To facilitate the making of a blood film on an ordinary microscope slide wherever and by whomever the blood specimen might be taken.

To provide apparatus utilizing a special smearing blade conforming to established standards of reliability, and replaceable easily and quickly as and when necessary.

To protect both the microscope slide and the smear blade from breakage.

A feature of the invention resides in the provision of a manually operable smear blade holder possessing travel-aligning guides, and adapted for cooperation with a supporting stand for the microscope slide, and, further, in the provision of special smear blades adapted for quick and easy insertion in and removal from the holder.

It is preferred that the smear blades be of glass, with a squared, blunt, smearing end essentially similar, though more precisely formed, than the end of a microscopic slide as presently used for blood smearing purposes. The corners of such smearing end are beveled, so as to confine the effective smearing portion to a predetermined width centrally of the blade. This width is narrower than the microscope slides on which the blood films are made, and is preferably slightly narrower than the customary cover slips applied for preserving the specimens.

Further objects and features of the invention will become apparent from the following detailed description of the preferred specific embodiment illustrated in the accompanying drawing.

In the drawing:

Fig. 1 represents a perspective view of the apparatus in the process of being manipulated to make a blood film on an ordinary microscope slide;

Fig. 2, a top plan view of the microscope slide resting on the supporting stand of the apparatus following the completion of a blood smearing operation, this view illustrating the blood film formed on the upper surface of the slide;

Fig. 3, a longitudinal central section taken vertically through the apparatus as shown in Fig. 1;

Fig. 4, an elevation of the blood smearing end of the blade and blade holder of the apparatus, the smearing blade being fitted into its place in the holder, as in the foregoing figures; and Fig. 5, a plan view of the smearing blade per se.

Referring to the drawing: In the illustrated instance, the apparatus of the invention comprises a rigid supporting stand 10, preferably molded to shape from one of the numerous industrial plastics presently available commercially, either a thermoplastic material or a thermosetting resin. It is preferably made in the form illustrated, namely, of elongate, truncated, pyramidal configuration, so as to provide an upper, flat table surface 10a of substantially the same dimensions as an ordinary microscope slide of glass, and sides and ends sloping downwardly therefrom to a relatively broad base, imparting stability. Thus, a microscope slide 11 may be easily held in flat, horizontal position on the surface 10a during the smearing of a blood film thereon.

For properly aligning a received slide on such supporting surface 10a, upstanding edge portions 12 and 13 are provided at opposite ends of the stand, the same being preferably molded integrally with the stand. The one portion, 12, may extend across one entire end of the supporting surface and around one corner, as shown, while the other portion, 13, is preferably very short and restricted to the one longitudinal side down which the first extends, so that slight variations in slide size are accommodated and the slide may be firmly held by the fingers of one hand at the same time that the stand is held, somewhat as illustrated in Fig. 1.

The apparatus also comprises a smear blade holder 14 having an elongate handle 14a and a blade-receiving member 14b. The entire holder is advantageously a metal stamping, and includes depending ears 15 at respectively oppositely lateral sides of the blade-receiving member. The width of such blade-receiving member between the depending ears 15 conforms closely to the width of an ordinary microscope slide, such as that shown at 11. Thus, the ears 15 serve to guide longitudinal travel of the smear blade holder 14 along the slide as it rests on the supporting stand 10. With the fingers holding the slide and stand adjacent the far ends thereof, as shown in Fig. 1, there is no interference with the movement of the smear blade holder.

The blade-receiving member 14b of the smear blade holder is formed for the quick and easy insertion and removal of replaceable smear blades, such as that indicated 16, and, for this purpose, has a central portion 17 struck downwardly, between the depending ears 15, from intermediate its width to serve as a resilient clip member relative to peripheral portions 18 which remain in the plane from which the clip member was struck. Thus, a blade inserted between the clip member 17 and the peripheral portions 18, from the free end of the blade-receiving member 14b, will be held fast in the holder 14 for blood smearing purposes.

The smear blades are preferably of glass, being advantageously of the same width and thickness as the slides, but considerably shorter, so as to fit snugly within the blade-receiving member 14b of the blade holders and protrude forwardly therefrom, somewhat as illustrated in Figs. 1 and 3. They have their smearing ends, see 16a, precision ground to provide a straight and smooth, squared, blunt end surface productive of uniform blood films.

The corners of the smearing end of the blade are preferably beveled, as at 19, see especially Fig. 5, to narrow the effective width of the blade to an extent appropriately less than the width of the microscope slide, and to center such effective width relative to the total width of the blade. Accordingly, the smear blade confines the blood film, see 20, Fig. 2, to an elongate area spaced inwardly of the longitudinal sides of the microscope slide and centered relative to the width of the slide. By making this width slightly less than the standard width of an ordinary cover slip (not shown), the blood film may be preserved as a microscope specimen over a period of years.

In the use of the apparatus, a drop of blood to be examined is deposited on one of the broad receiving surfaces of the slide near an end thereof. The slide is then placed upon the supporting stand 10, and held tightly thereon in its aligned position as established by the upstanding edge portions 12 and 13. The smearing blade holder 14, in which a smear blade 16 has been inserted, is grasped by its handle 14a and brought into correlated operative position relative to the slide. In this position, the depending ears 15 substantially bear against opposite longitudinal edge surfaces of the slide, as guides, and the smearing end 16a of the blade 16 extends transversely across the slide in substantially perpendicular relationship with the longitudinal edges thereof and with its lower edge bearing firmly against the upper surface thereof.

As so positioned, the blade holder 14 is pulled backwardly into contact with the drop of blood, which flows laterally along the effective width of the blade by reason of capillary attraction, to form a transversely extended body of blood 21, Fig. 3. For the actual making of the blood film, the handle 14a of the blade holder is preferably brought to the position shown in Fig. 3, that is to say, approximately parallel with the slide, and the entire holder is pushed forwardly with a firm and steady motion until the blood is completely distributed in the form of the film 20, Fig. 2, which, as indicated, gradually becomes thinner from beginning to end, has rectilinear sides, and is spaced inwardly from the edges of the slide.

During this blood smearing stroke, the blade holder 14 is guided, and kept in proper position relative to the slide, by means of the depending ears 15. In this connection, it should be noted that such depending ears are preferably elongate longitudinally of the holder to provide the greatest possible bearing area against the longitudinal edge surfaces of the glass slide.

It can be readily appreciated that both the slide and the smearing blade are protected against breakage by the slide supporting stand and the blade holder of the invention, and that the apparatus may be utilized wherever a specimen is taken, whether at the bedside of a patient or in the laboratory. Furthermore, because of the ready removability and replaceability of the blades 16 relative to the holder, it will be apparent that a supply of replacement blades may be kept on hand, just as in the case of microscope slides.

Whereas this invention is here illustrated and described with respect to a particular preferred embodiment thereof, it should be understood that various changes, apart from the mere substitution of equivalents, may be made therein and various other constructions may be adopted on the basis of the teachings hereof, by those skilled in the art, without departing from the protective scope of those of the following claims which are generic to the broader inventive concepts disclosed.

I claim:

1. Apparatus for making blood films on microscope slides, comprising a supporting stand for the microscope slide, said stand having a slide-supporting surface at its top substantially conforming in dimensions with the dimensions of said slide, and abutment members marginal to said surface for aligning and retaining the slide upon said surface; and a blood smearing implement, which includes a smearing blade, and a manually operable blade holder, said blade holder having an elongate handle member and a blade-receiving member at one end of said handle member, the blade-receiving member having a width substantially equal to the width of a microscope slide, depending ears at opposite lateral sides thereof for guiding the travel of said implement along the upper surface of a microscope slide supported by said stand, and means for retaining said smearing blade within the holder, the said ears of the blade-receiving member of the blade holder having depending lengths effectively greater than the thickness of said slide, so as to slide along said stand substantially in sliding contact with the lateral sides thereof, as guides for said blood-smearing implement.

2. The combination recited in claim 1, wherein the means for retaining the smearing blade within the holder is a clip member depending from the underside of said blade-receiving member between said depending ears and arranged to frictionally secure said blade at said underside of the blade-receiving member and between said depending ears.

3. The combination recited in claim 2, wherein at least said blade-receiving member of said blade holder is a metal stamping, and both said depending ears and said clip member are struck downwardly from the principal plane of said blade-receiving member.

4. The combination recited in claim 1, wherein said abutment members include upstanding rim portions at one end and an adjacent portion of one side of said supporting surface, and an upstanding rim portion adjacent the opposite end of said one side of the supporting surface.

5. The combination recited in claim 1, wherein the smearing blade has the corners of its smearing end beveled to provide an effective smearing width which is materially less than the width of said microscope slide.

CRICHTON McNEIL.

References Cited in the file of this patent

UNITED STATES PATENTS

| Number | Name | Date |
|---|---|---|
| 186 | Whitney | Jan. 12, 1858 |
| 241,492 | Howell | May 17, 1881 |
| 1,442,559 | Doty | Jan. 16, 1923 |
| 1,840,777 | Hunter | Jan. 12, 1932 |
| 2,008,952 | Gach | July 23, 1935 |
| 2,081,320 | Burgess | May 25, 1937 |
| 2,081,735 | Caronia | May 25, 1937 |
| 2,353,852 | Rowland et al. | July 18, 1944 |
| 2,402,310 | Beaumier | June 18, 1946 |
| 2,425,526 | Friedman | Aug. 12, 1947 |
| 2,536,311 | Rojakovick | Jan. 2, 1951 |